United States Patent [19]

Case

[11] 3,837,073

[45] Sept. 24, 1974

[54] METHODS OF MANUFACTURING MAGNETIC TRANSDUCING HEADS

[75] Inventor: Derek Frank Case, Sunbury-on-Thames, England

[73] Assignee: International Computers Limited, London, England

[22] Filed: June 5, 1973

[21] Appl. No.: 367,303

[30] Foreign Application Priority Data

June 6, 1972 Great Britain .................... 26230/72

[52] U.S. Cl. .............. 29/603, 29/593, 179/100.2 C, 179/100.2 P

[51] Int. Cl. .............................................. G11b 5/42

[58] Field of Search ........ 29/603, 593; 179/100.2 C, 179/100.2 P; 340/174.1 F, 174.1 E; 346/74 MC, 74 MD

[56] References Cited

UNITED STATES PATENTS

| | | | |
|---|---|---|---|
| 3,187,410 | 6/1965 | Duinker et al. | 29/603 |
| 3,353,261 | 11/1967 | Bradford et al. | 29/603 |
| 3,514,851 | 6/1970 | Perkins et al. | 29/603 |
| 3,668,775 | 6/1972 | Morita et al. | 29/603 |
| 3,722,081 | 3/1973 | Neace | 29/603 |
| 3,760,494 | 9/1973 | Lang, Jr. | 29/603 |

*Primary Examiner*—Charles W. Lanham
*Assistant Examiner*—Carl E. Hall
*Attorney, Agent, or Firm*—Misegades, Douglas & Levy

[57] ABSTRACT

A method of manufacturing a component of a magnetic transducing head is disclosed in which ferrite strips are spaced apart by a non-magnetic gap and are then surrounded by a non-magnetic material. The resulting structure is divided into slices each of which contains a pair of ferrite portions with a predetermined gap between them. The slice may be profiled on one face for co-operation with a record disc and a yoke secured to the other face to complete the magnetic circuit.

8 Claims, 15 Drawing Figures

METHODS OF MANUFACTURING MAGNETIC TRANSDUCING HEADS

BACKGROUND OF THE INVENTION

The present invention relates to methods of manufacturing magnetic transducing heads.

It is known to manufacture magnetic transducing heads having cores of ferrite material by bonding two pieces of ferrite together by means of glass, the ferrite pieces being spaced by a small distance to provide a non-magnetic gap which is filled by the bonding glass and then to divide the assembly by cutting into a plurality of core units each consisting of two core parts bonded together with a non-magnetic transducing gap therebetween. After providing a winding on the core, the head is then secured in a housing by means of which the head is mounted in the recording apparatus. In the case of recording apparatus using a magnetic disc as a recording medium, it is common to shape the surface of the housing so as to cause air entrained by rotation of the disc to act on this surface and result in the head and its mounting to fly over the disc out of contact with the disc. The core parts of heads for recording digital data on discs need to be very small in order to obtain a high packing density of the recording on the disc and hence such heads are difficult to handle and secure in the correct position in their housing as well as being extremely fragile.

SUMMARY OF THE INVENTION

According to the present invention a method of manufacturing a magnetic transducing head includes the steps of assembling at least two elongate members of ferrite in predetermined spaced relationship; surrounding the assembly by a non-magnetic material; and slicing the non-magnetic material and the ferrite members transversely of the ferrite members to produce a plurality of slices of the non-magnetic material, each slice containing a portion of each ferrite member extending through the thickness of the slice in said predetermined relationship, and forming a mounting for the magnetic head.

One face of the slice may be shaped for co-operation with a record medium so that the exposed ends of the ferrite portions form pole-tips spaced apart by a non-magnetic transducing gap. A magnetic yoke may be positioned on the other face of the slice to co-operate with the ferrite portions to complete the magnetic cores of the transducing head.

BRIEF DESCRIPTION OF THE DRAWING

A method of manufacturing a magnetic transducing head embodying the present invention will now be described, by way of example, with reference to the accompanying drawing, in which.

DESCRIPTION OF THE PREFERRED EMBODIMENT

Figure 1:
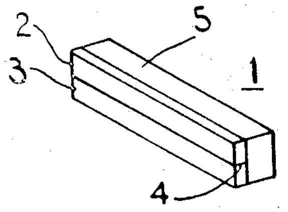
FIG. 1 shows a block having a number of component pieces.

Referring now to the drawings FIG. 1 shows a composite assembly 1 consisting of a pair of ferrite members 2 and 3 bonded together in spaced relationship by, for example, glass so as to define a non-magnetic gap 4 therebetween. The bonded members 2 and 3 may be formed by spacing two plates of ferrite apart a distance equal to the desired gap by means of spacer strips deposited on one of the plates. The plates are bonded together by introducing molten glass into the gap which is then allowed to cool. The bonded plates are then sliced to produce a plurality of bonded ferrite members 2 and 3 with non-magnetic gap 4. Finally a glass ceramic member 5 is bonded to the gapped ferrite members 2, 3 using a bonding agent such as, for example, glass and the exposed face of the ferrite members is lapped to reduce the thickness to correspond to a required track width on a recording medium with which the head is later to be associated.

Figure 2:
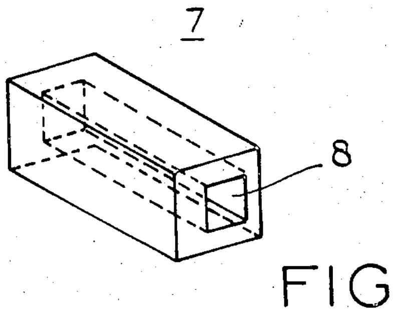
FIG. 2 shows a hollow block of non-magnetic material.

FIG. 2 shows a hollow glass ceramic block 7 having an aperture 8 passing therethrough, the aperture 8 being shaped so that the assembly 1 may be contained within the block. The block 7 may be produced, for example, by a conventional hot pressing operation.

Figure 4:
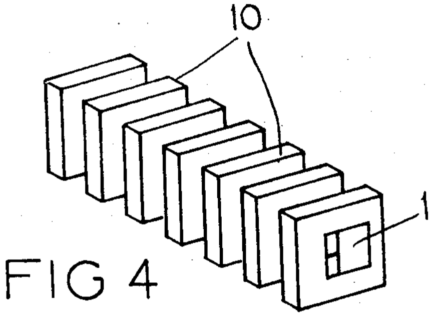
FIG. 4 illustrates the derivation of slices from the assembly of FIG. 3.
Figure 3:
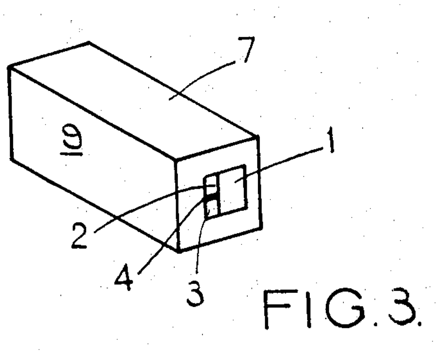
FIG. 3 shows an assembly formed from the blocks of FIGS. 1 and 2.

The composite assembly 1 is now bonded into the block 7 as shown in FIG. 3 using, for example, a known injection glass moulding process or by heating the block 7, with the assembly 1 positioned therein, in a low atmospheric pressure and applying glass powder adjacent the interface between the assembly 1 and the block 7 so that the glass powder becomes molten and upon raising the atmospheric pressure the molten glass flows into the block 7 to bond the assembly 1 to the block. Preferably the atmospheric pressure is increased and decreased a number of times in order to reduce occlusion of gas in the molten glass. The composite assembly 9 thus produced is cut into slices 10 as shown in FIG. 4, each slice 10 forming a component, containing a pair of gapped ferrite members, from which a pole-piece unit is to be formed.

In the case of transducing heads particularly for use in conjunction with, for example disc stores, it is frequently required that the heads should be so shaped that they may be stably supported very close to the recording medium with which they are to be associated. In particular, in the case of disc stores, the head operating surface adjacent the disc is required to have a predetermined, and frequently critical, configuration in order that the finished head block will fly at the required spacing and attitude with respect to the recording medium. In producing the required configuration it is necessary that the ferrite members, which will form the pole-pieces of the finished head, shall not be reduced in depth beyond a predetermined minimum. Thus, the slice 10 is initially made rather thicker than this minimum depth.

Figure 5:
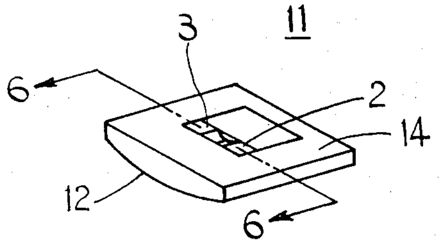
FIG. 5 shows a pole-piece unit.
Figure 6:
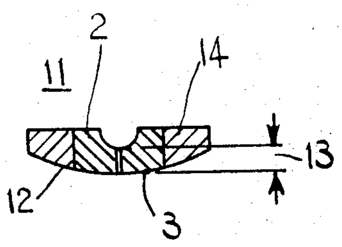
FIG. 6 shows a section on the line 6—6 of FIG. 5.

FIGS. 5 and 6 show a finished pole-piece unit 11 formed from one of the slices 10. The pole-piece unit 11 is produced by forming the operating surface or profile 12 on one face of the slice 10 and removing some of the ferrite from the opposite or rear face of the slice 10 in the vicinity of the gap to define the pole tip depth 13. The profile 12 may be formed by a grinding operation for example. The removal of ferrite from the rear of the pole-pieces 2 and 3 to define the pole tip depth may be performed by using a rotating lap or an abrasive wheel, for example, as shown in FIG. 6, the profiled front face 12 being used as a datum face. Finally the surface 14 is polished to render it optically flat in order to provide a mating face for the attachment of a yoke assembly which may be made in the following manner.

Figures 7A, 7B:
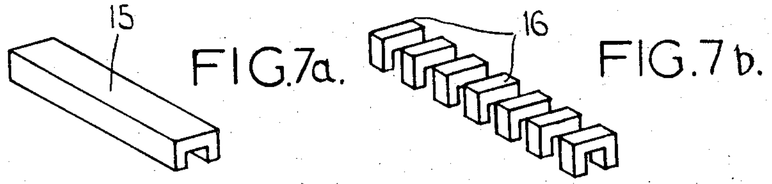
FIG. 7*a* shows a ferrite block of channel section.
FIG. 7*b* illustrates the derivation of slices from the ferrite block of FIG. 7*a*.

Referring now to FIG. 7*a* a ferrite bar 15 is formed by, for example, grinding, so as to have a section which is substantially C-shaped. The ferrite bar 15 is then cut into slices to produce a plurality of C shaped yoke pieces 16 as shown in FIG. 7*b*.

Figure 8:
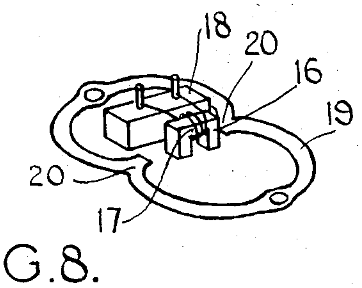
FIG. 8 shows the component parts of a yoke assembly.
Figure 9:
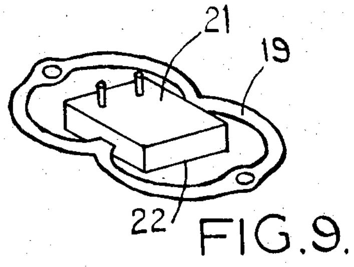
FIG. 9 shows a yoke assembly.

FIG. 8 shows a yoke piece 16 having a coil 17 wound thereon. A terminal block 18 is provided to facilitate connection to the coil 17 and a head support member 19, which may be formed from a resilient material such as, for example, beryllium copper, is provided. The yoke piece 16, the terminal block 18 and the support member 19 are required to be accurately aligned and positioned relative to one another by, for example, a jig or fixture, prior to the next step in the manufacture which consists of encapsulating the yoke piece 16; the terminal block 18 and the portions 20 of the support member 19 to produce the complete yoke assembly 21 bonded to the support member 19 as shown in FIG. 9. The encapsulating material may be an epoxy synthetic resin loaded with glass fibre. Finally the surface 22 of the yoke assembly 21, is polished to be optically flat in order that it may be accurately mated to surface 14 of the pole piece block 11.

Figure 10:
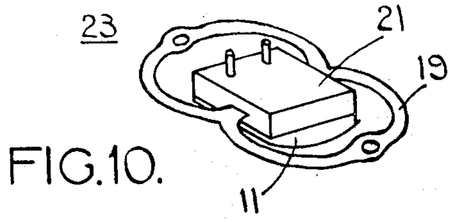
FIG. 10 shows a head assembly.
Figure 11:
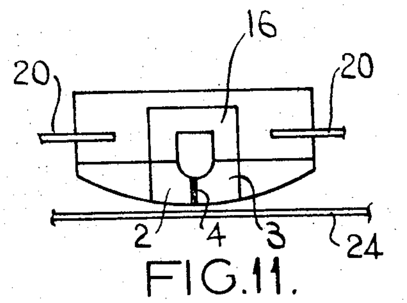
FIG. 11 shows the relative positions of polepieces and a yoke portion within the head assembly.

The pole piece unit 11 and the yoke assembly are independently tested at this stage of manufacture. The pole piece unit 11 is dynamically tested in a test apparatus which includes a yoke assembly 23, which is known to be satisfactory to which the pole piece unit 11 to be tested is temporarily secured with the yoke 16 and pole pieces 2, 3 aligned as shown in FIG. 10 and 11. The test apparatus also includes a magnetic record disc 24 and the head assembly formed by the yoke assembly 21 and the pole piece unit under test is caused to fly over the disc 24 by air extrained by the rotating disc which acts on the profiled face 12 to lift the head out of contact from the disc 24. The magnetic characteristics of the tested unit 11 are measured by recording and reading signals on the disc with the head assembly and the dynamic characteristic of the profiled face 12 is assessed in relation to its spacing from the disc 24 under operating conditions. Similarly the yoke assembly 21 is dynamically tested in test apparatus which includes a satisfactory pole piece unit 11 and a rotating record disc 24.

The satisfactory pole piece unit 11 is temporarily secured to the yoke assembly 23 to be tested aligned as shown in FIGS. 10 and 11 and the head assembly so formed is mounted in the test apparatus by means of the support member 19. The yoke 16 and winding 17 are tested by recording and reading signals on the disc 24 and the mechanical characteristics of the support member 19 are checked in relation to the flying of the head assembly over the disc 24.

After testing of the yoke assemblies 21 and the pole piece units 11, satisfactory assemblies 21 and units 11 are bonded together as shown in FIGS. 10 and 11. It will be appreciated that the yoke assembly 21 and the pole piece unit 11 are required to be accurately aligned in order that the yoke piece 16 is correctly positioned relative to the pole pieces 2 and 3 and this may be accomplished, for example, by providing reference edges on the two components 11 and 21. When the pole piece unit 11 and the yoke assembly 21 are correctly aligned they are secured together by a bonding operation, a suitable bonding agent for this purpose may be an epoxy synthetic resin, for example. To facilitate this operation holes may be formed through the yoke assembly 21.

It will be understood that a multitrack head assembly may be manufactured using the technique described above. In this case the assembly of FIG. 1 will be constructed with a number of the gapped ferrite members spaced from one another by glass ceramic members. The number of gapped ferrite members will, of course, correspond to the number of tracks required and the glass ceramic members will form intertrack spacers.

It will also be understood that the assembly 9 of FIG. 3 may, for example, be built up from glass ceramic blocks arranged around the gapped ferrite members 2 and 3 instead of being preformed as previously described. Alternatively the assembly 1 may be accurately positioned in a mould fixture and the final assembly 9 obtained by a hot pressing or sintering operation.

Figure 12:
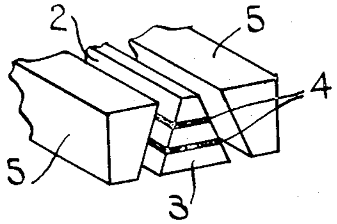
FIG. 12 shows a modification of the block of FIG. 1.

If required more than one non-magnetic gap may be provided in each head assembly. In this case the gaps may be of different widths as is required, for example, when an erase gap needs to be wider than an associated read/write gap. A method of forming a structure similar to the structure 1 of FIG. 1 but having two gaps of different widths is shown in FIG. 12. In this case the ferrite portions 2 and 3 are tapered in thickness and contain two gaps 4 of different widths. The glass ceramic members 5 are shaped so that the final structure retains the required sectional dimensions.

Figure 13A:
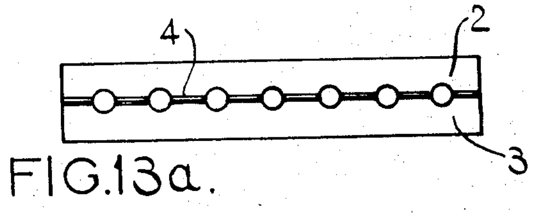
FIGS. 13*a* and *b* illustrate an alternative method of forming pole tips.
Figure 13B:
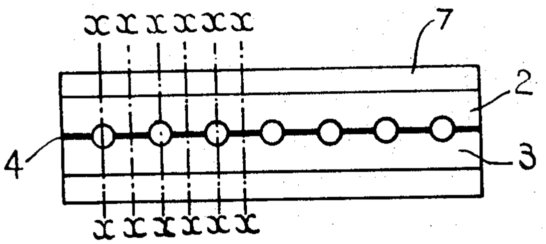

A further method of adjusting the pole tip depth 12 is shown in FIG. 13. In this case the gapped ferrite slices 2, 3 are drilled as shown in FIG. 13*a*, the holes being positioned so that when the block 7 is sliced along lines *x—x* as shown in FIG. 13*b* part of a drilled hole remains in each slice to produce a pole tip depth somewhat greater than the required finished depth so that the operation of forming the profile on the slice also reduces the pole tip depth to the required dimension.

Although the mating surfaces on the yoke assembly and the pole-piece unit are described as being formed as optical flats it will be realised that it is unnessary for these surfaces to be flat provided that they are complementary and can be brought into intimate contact.

It will also be realised that the head support member 19 may be omitted if desired and also that, in addition to the terminal block 18 being encapsulated, any further component or device such as, for example, a preamplifier may also be included in the encapsulation.

Finally, although two specific head assemblies, having one and two non-magnetic gaps respectively, have been described, it will be obvious that head assemblies having any gap configuration may be produced using the described technique as long as the pole-piece block and the yoke assembly are each manufactured and tested independently of one another before being finally joined together to produce a complete head assembly.

I claim:

1. A method of manufacturing a magnetic transducing head including the steps of bonding at least two elongate ferrite members in predetermined spaced relationship to form a non-magnetic gap therebetween; surrounding the bonded ferrite members with a non-magnetic material to form an elongate assembly; making a plurality of spaced cuts through the assembly transverse to the length of the assembly to produce a plurality of separate slices of the assembly, each slice including a portion of each of said ferrite members separated by said predetermined non-magnetic gap and surrounded by a section of said non-magnetic material with opposite ends of the portions of the ferrite members being exposed in opposite faces of the slice.

2. A method as claimed in claim 1 and including the steps of shaping one face of the slice for co-operation with a record medium to form the ends of the ferrite portions exposed in said one face into pole tips spaced apart by said predetermined non-magnetic gap.

3. A method as claimed in claim 2 in which said one face of the slice is shaped so as to cause the magnetic head to fly out of contact over the record medium.

4. A method as claimed in claim 2 and including the step of positioning a magnetic yoke carrying a coil on the face opposite said one face of the slice, the yoke being aligned to complete a magnetic path between the ferrite portions in the slice.

5. A method as claimed in claim 1 including the steps of mounting the ferrite members in side-by-side relationship on a non-magnetic support spaced apart by said non-magnetic gap; reducing the thickness of at least one ferrite member adjacent the gap to a predetermined thickness.

6. A method as claimed in claim 1 including the steps of machining the bonded ferrite members to define a series of pairs of pole pieces of the desired shape and in which the spaced cuts are made at such positions that each slice contains a pair of shaped pole pieces.

7. A method as claimed in claim 1 including the step of bonding three ferrite members together with two parallel non-magnetic gaps therebetween.

8. A method as claimed in claim 7 including the step of machining the bonded ferrite members so that one non-magnetic gap has a greater transverse width than the other non-magnetic gap.

* * * * *